Aug. 22, 1961 R. L. CONGER ET AL 2,997,695

MAGNETIC CORE STORAGE DEVICE

Filed April 6, 1956

INVENTORS,

ROBERT L. CONGER

ALFRED F. KUDELA

BY G. D. O'Brien

V. C. Muller

ATTORNEYS

United States Patent Office 2,997,695

Patented Aug. 22, 1961

2,997,695

MAGNETIC CORE STORAGE DEVICE

Robert L. Conger, Riverside, and Alfred F. Kudela, Arlington, Calif., assignors to the United States of America as represented by the Secretary of the Navy Filed Apr. 6, 1956, Ser. No. 576,751

3 Claims. (Cl. 340—174)

(Granted under Title 35, U.S. Code (1952), sec. 266)

The invention described herein may be manufactured and used by or for the Government of the United States of America for governmental purposes without the payment of any royalties thereon or therefor.

This invention relates to magnetic cores and more particularly to methods and means for using evaporated thin metal films as magnetic cores for computer storage in high speed digital computing machine memories.

Many magnetic alloys have been utilized for forming magnetic cores as memories for digital computing machines. Some of these cores have been formed of thin sheets or strips of magnetic material or ferrites formed in a toroidal shape and forming a closed magnetic path or loop with the driving and sensing wires threaded through the opening in the magnetic material. An application of M. S. Blois, Serial No. 448,394, filed August 6, 1954, now Patent No. 2,853,402, discloses magnetic cores prepared by vacuum deposition of thin films of a ferromagnetic alloy onto a nonconducting substrate. These films were formed in an annular shape or other shape to form closed loop or toroidal cores also requiring the two driving wires and one sensing wire to be threaded through the holes in each of the toroids. This required slow, tedious and expensive operations to construct a magnetic memory.

The present invention consists essentially of the combination of one or more extremely thin continuous flat films of magnetic alloy with one or two drive wires and a sensing wire extending in planes parallel to the plane of the film to form a magnetic memory for equipment such as a high speed digital computing machine. The thin films of magnetic alloy are deposited on nonconducting substrates without voids, preferably by vacuum evaporation. These films are so thin that the demagentizing fields at the ends of the film can be ignored and the magnetic cores thus formed have a rectangular hysteresis loop, even though the core does not form a closed loop magnetic path, and the driving and sensing wires extend parallel to the plane of the film, and are not wound, looped or threaded with respect to the magnetic core.

The magnetic memories of the present invention can be simply and economically produced by utilizing conventional evaporation and printed circuit techniques and laminating the layers of cores and wiring to form a complex memory of any size.

One object of the present invention is to provide a novel method and means for using extremely thin evaporated metal films of magnetic alloys as magnetic cores for high speed digital computing machine memories.

Another object of the present invention is to provide a simple and inexpensive manner of forming a high speed digital computing machine memory wherein each of the magnetic cores has a rectangular hysteresis loop.

A further object of the present invention is to provide a novel method and means for constructing a memory for high speed digital computing machines utilizing printed circuit techniques with the magnetic cores formed on one substrate and the driving and sensing wires formed on adjacent parallel substrates.

Still another object of the present invention is to provide a magnetic core for a coincident-current type memory which does not require the drive wires and sensing wires to be threaded through or wound or looped around the magnetic core.

Other objects and many of the attendant advantages of this invention will be readily appreciated as the same becomes better understood by reference to the following detailed description when considered in connection with the accompanying drawings wherein.

Figure 1:
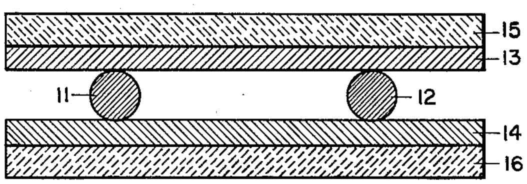
FIG. 1 is an enlarged cross-sectional view illustrating one element of a computing machine memory utilizing one preferred embodiment of the present invention.

Referring now to the drawings in detail and more particularly to the sectional view in FIG. 1, a driving wire 11 and a sensing wire 12 extend parallel to each other and in a plane parallel to the planes of the two films of magnetic material 13 and 14.

In the embodiment illustrated in FIG. 1 the layers of magnetic material 13 and 14 are preferably deposited as an extremely thin film by vacuum evaporation onto the nonconducting glass or ceramic substrates 15 and 16. The driving wire 11 and the sensing wire 12 are shown as conventional round wires but may be formed by evaporating layers of conducting material on a substrate or backing of nonconducting material or by conventional printed circuit techniques.

It will be understood that other methods of depositing very thin films other than evaporation may be used although this is the only known method of making films having the proper thickness.

A memory utilizing the principles of the present invention particularly as illustrated in FIG. 1 may be in the form of a thin printed circuit sheet sandwiched between two plates of glass. Each plate of glass serves as a substrate for a rectangular array of evaporated squares about one centimeter on a side of magnetic alloy. A pair of adjacent alloy squares and the printed circuit lines between them would constitute one element of the memory.

The term printed circuit as used herein is intended to include all suitable methods such as etching, evaporating, painting, etc. well known in the art.

One preferred magnetic alloy which has been successfully used has a composition of about 34% iron, 21% cobalt and 45% nickel. This alloy is commonly referred to as Perminvar. It has a $B_{max}$ of about 15,000 gauss. However, other alloys having similar magnetic characteristics may also be used. Evaporated films of 80% nickel and 20% iron have also been successfully used.

The square cores are preferably formed by evaporating the alloy onto a heated soft glass substrate placed in a magnetic field of a few oersteds. The composition of the initial crucible load is chosen to be slightly different than the desired evaporated film composition in order to take into account the different distillation rates of the alloy constituents. The films which have provided the highest signal to noise ratio in the arrangement illustrated in FIG. 1 have been about 10,000 angstroms thick, however, somewhat thicker and thinner films are operative but do not provide the optimum characteristics in this particular geometric arrangement. The hysteresis loop of the film is substantially square in the direction of the applied field in the plane of the film. This squareness is probably the result of an interaction between the magneto striction of the alloy and a strain produced in the film as it cools because of the different coefficients of expansion of the alloy and the glass. The coercive force of the Perminvar films is about 1.5 oersteds.

A comparison of the film arrangement of the present invention as illustrated in FIG. 1 with a ferrite toroid used in a coincident current memory shows that this thin film unit is comparable to the ferrite toroid in output voltage and driving current and should make a suitable unit for a coincident current memory.

The ferrite core considered had an outside diameter of .090 inch. From this it was estimated that its cross-sectional area was about $1.3 \times 10^{-3}$ centimeters square. Its $B_{max}$ was approximately 2,000 gauss. The product of these two figures shows that the total flux through the toroid is about 2.6 Maxwell's. The films described above had a cross-sectional area of $10^{-4}$ centimeters and a $B_{max}$ of about 15,000 gauss so that its total flux was about 1.5 Maxwell's, a value very near that for the ferrite. Although the film is quite thin it is relatively wide and has a relatively high $B_{max}$ compared to the ferrite. The coercive force of the films is also about that for the ferrite, 1.5 oersteds.

The time integral of the voltage induced in the pickup is proportional to the flux change which encloses the pickup. The ferrite toroid completely encloses its pickup wire and as a result all the flux change is effective in inducing a voltage in the pickup. With the assembly of films and wires in FIG. 1, the films almost completely surround the pickup wire and so almost all the flux changes will be effective in inducing a voltage.

Ferrite toroids are made so small that all the ferrite will be close to the drive wire and as a result only a small current in the wire will produce a sufficient magnetic field in the toroid. With the thin film unit the Perminvar is quite near the driving loop and so, as in the case of the ferrite, a current of an ampere or less through one wire will produce a sufficient field to switch the core.

Figure 2:
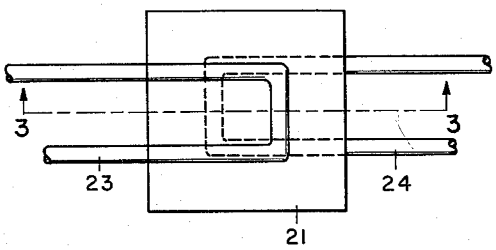
FIG. 2 is a plan view on an enlarged scale of a magnetic memory particularly adapted to be formed by utilizing printed circuit techniques on laminated substrates and illustrating another preferred embodiment of the present invention.
Figure 3:
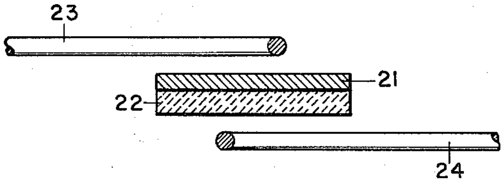
FIG. 3 is a sectional view taken on line 3—3 of FIG. 2.

In the modification illustrated in FIGS. 2 and 3 the film of magnetic material 21 is also deposited as an extremely thin film preferably by vacuum evaporation on a glass or ceramic substrate 22.

The drive winding 23 and the pickup or sensing winding 24 are preferably in the form of hairpin loops which overlap the center line of the area on which the layer of the magnetic material 21 is deposited. It has been found that with the geometrical arrangement illustrated in FIGS. 2 and 3 the coupled noise present in the pickup winding 24 is substantially cancelled.

Figure 4:
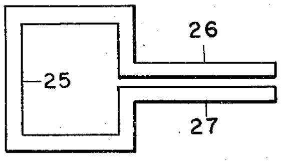
FIG. 4 is an enlarged view illustrating another alternate shape for the hairpin loop in an arrangement such as that illustrated in FIGS. 2 and 3.

Another preferred form of loop for the drive winding and pickup winding in arrangements such as that illustrated in FIGS. 2 and 3 is shown in FIG. 4 wherein a substantially square loop 25 of wire or as a portion of a printed circuit is provided with two leads 26 and 27.

Utilizing the arrangement illustrated in FIGS. 2 and 3 and the loops as illustrated therein or loops as illustrated in FIG. 4, it should be noted that the loops substantially overlap one another since without this overlapping the coupled noise present in the pickup winding cannot be cancelled. When the two loops are positioned properly the air coupling is cancelled almost completely resulting in a very high signal to noise ratio. With precise placement of the loop windings with respect to the film, as well as with orientation of the film to take advantage of the high degree of orientation, a higher signal to noise ratio can be obtained. The optimum positioning of the loops with respect to the film does not occur, contrary to expectation, when the loops are closest to the magnetic film, but rather at a definite distance from the film. Careful positioning will provide an even higher signal to noise ratio. With the loops as illustrated in FIG. 4, it is sometimes found that better results are obtained when one of the loops is slightly larger than the other and in some cases the area of magnetic material may be somewhat smaller than the width of the loop.

A complete memory utilizing magnetic cores as illustrated in FIGS. 2, 3 and 4 could readily be formed utilizing conventional printed circuit techniques and evaporation in the following manner. A sheet of glass may be used as a substrate for a plurality of discrete areas of thin magnetic films. The films are evaporated onto the substrate through a mask with holes. This produces an array of small islands of magnetic material with each island serving as a memory element. The drive winding may consist of a flat printed circuit produced by a photo etch process. The printed circuit has a very thin sheet serving as an insulator and backing. There is a separate flat sheet with a circuit for each drive and inhibit winding. The pickup winding may also be a photo etched printed circuit. These sheets with circuits could be as thin or thinner than 0.002 inch. Therefore a complete memory plane would be only 0.010 inch thick. This would include two drive windings, one inhibit winding, one pickup winding and one magnetic film layer. No wires pass through the center of the cores. The magnetic islands are shaped like bar magnets with a thickness of about 2,000 angstroms. The length and width are on the order of a few millimeters.

Another method adapted to utilize the concepts of the present invention would be the successive evaporation on a substrate in a vacuum of the discrete areas of ferromagnetic material, alternate insulating layers and conducting layers through suitable masks to form a complete memory unit.

Such a memory would offer many advantages such as higher speeds of operation and better control of magnetic properties which yields greater reliability. Furthermore, it offers simplicity of construction and lower power dissipation. These factors would make the entire device inexpensive and very versatile.

In forming a complete magnetic memory composed of many discrete memory elements other conventional techniques for balancing the mutual inductively coupled signals may be utilized such as reverse winding whereby the pickup of one loop is 180° out of phase with the pickup of the succeeding loop. Together with this the method of using a balanced output with the center tap to ground may be used to balance out the capacitive coupling and the output winding may be fed in a transformer which has an electrostatic shield between the primary and secondary.

*Theory*

The two important criteria to provide successful operation of a memory element in accordance with the present invention appear to be the ratio of the thickness of the film to the length of the film and the absolute thickness of the film itself. If the absolute thickness of the film is more than 10,000 angstroms the hysteresis loops start losing squareness. Above 50,000 angstroms the hysteresis loop will be unsatisfactory for most computer memory element applications. Below a thickness of 1,000 angstroms the element starts losing its saturating flux density and the resulting signal decreases.

The most important factor, however, appears to be the effect of the demagnetizing field on the hysteresis loop of a magnetic core such as that disclosed in the present invention which does not form a closed flux path.

The magnetic poles that form at the ends of the flux paths produce local fields which oppose the external field applied to the core. These local fields are called demagnetizing fields. The strength of the demagnetizing field is a function of the degree of magnetization of the core and of the core geometry. The geometric function is usually expressed as a demagnetizing factor N. The demagnetizing field may be expressed in the following equational form:

$$\Delta H = NM \qquad (1)$$

where $\Delta H$ is the demagnetizing field, N is the demagnetizing factor, M is the magnetization of the core. The term N can only be calculated for ellipsoids; therefore, the thin flat sheet of ferromagnetic material being considered will be approximated by an oblate ellipsoid or ellipsoidal disc. For the oblate ellipsoid, in a uniform magnetic field, the demagnetizing factor is given by the equation:[1]

$$\frac{N}{4\pi}=\frac{1}{2}\left[\frac{m^2}{(m^2-1)^{3/2}}\sin^{-1}\frac{(m^2-1)^{1/2}}{m}-\frac{1}{m^2-1}\right] \quad (2)$$

where $m$ is the ratio of one of the two long equal axes of the ellipsoid to the short axis. For $m$ very much larger 1.0, this equation reduces to:

$$\frac{N}{4\pi}=\frac{\pi}{4m} \quad (3)$$

The values of the demagnetizing fields for a 4–79 Mo-Permalloy disc 1.0 cm. in diameter and $3.13\times10^{-4}$ cm. (⅛ mil) thick, and a disc of 80% Ni, 20% Fe 1.0 cm. in diameter and $2.5\times10^{-5}$ cm. (.01 mil) thick will now be calculated and compared. For the 4–79 Mo-Permalloy disc, $m=3.14\times10^3$, $N/4\pi=.25\times10^{-3}$, $4\pi M=7800$ gauss, and so:

$$\Delta H=\frac{N}{4\pi} \quad 4\pi M=2 \text{ oersteds} \quad (4)$$

For the 80% Ni, 20% Fe disc, $m=.4\times10^5$, $N/4\pi=1.96\times10^{-5}$, $4\pi M=10^4$ gauss and $$\Delta H=.196 \text{ oersted}$$

Now assume that both discs are made of material which will give a perfectly square hysteresis loop if the demagnetizing field effects are eliminated and that each disc has a coercive force of 1.0 oersted. The demagnetizing field of 2.0 oersteds will cause the hysteresis loop of the 4–79 Mo Permalloy disk to be tilted by an amount greater than the coercive force, while the demagnetizing field of .196 oersted for the 80% Ni, 20% Fe film will cause the hysteresis loop of this film to be tilted only slightly.

It can be seen that a one centimeter square of the thinnest rolled ribbon ⅛ of a mil thick will show a considerable demagnetizing effect and as a result the hysteresis loop of this square sheet of rolled film cannot be rectangular. However, it can also be seen that an evaporated film 2500 angstroms thick and one centimeter square will have a very small demagnetizing field and therefore can have an almost rectangular hysteresis loop. Briefly stated, it may be said that on the scales of thickness the film of the present invention is effectively an infinite plane and thus the pole strength is so small that there is a negligible demagnetizing field in most of the film.

Obviously many modifications and variations of the present invention are possible in the light of the above teachings. It is therefore to be understood that within the scope of the appended claims the invention may be practiced otherwise than as specifically described.

What is claimed is:

1. A magnetic memory comprising a flat plate of non-conducting material at least one very thin film of ferromagnetic material covering a discrete area on said flat plate of non-conducting material, said thin film forming a magnetic core, said thin film being a continuous surface having no voids therein, at least one driving wire extending in a plane substantially parallel to the plane of said film, and a sensing wire also extending in a plane substantially parallel to the plane of said film said wires substantially fixed in position with respect to said thin film, said film of ferromagnetic material being of such thinness that any demagnetizing fields produced at the ends of the film can be ignored and said magnetic core thus formed having magnetic saturation curve characteristics indicated by a substantially rectangular hysteresis loop in the direction of an applied field in the plane of said film even though said magnetic core in itself does not form a completely closed loop magnetic path, and said driving and sensing wires lying substantially parallel to said film each forming loops and overlapping in the area of said film.

2. A magnetic memory comprising two flat plates of non-conducting material each having a very thin continuous film of ferromagnetic material thereon and extending in substantially parallel planes said thin films each covering a discrete area on their respective flat plate of non-conducting material and each forming a magnetic core which in itself does not form a completely closed loop magnetic path, at least one drive wire, and a sensing wire, adjacent portions of said wires being substantially fixed in position with respect to said thin films and being substantially parallel and extending in planes substantially parallel to said films said films of ferromagnetic material being of such thinness that any demagnetizing fields produced at the ends of the films can be ignored and said magnetic cores formed by said thin films having magnetic saturation curve characteristics indicated by substantially rectangular hysteresis loops in the direction of an applied field in the planes of said films.

3. A magnetic memory comprising a flat plate of non-conducting material a very thin film of ferromagnetic material covering a discrete area on said flat plate and forming a magnetic core, at least one drive wire, and a sensing wire, said wires being substantially fixed in position with respect to said thin film and each having portions substantially parallel to each other and to the plane of the film, one of said wires being positioned on one side of said film and the other wire being positioned on the opposite side of said film said film of ferromagnetic material being of such thinness that any demagnetizing fields produced at the ends of the film are negligible and the magnetic core formed by said film having magnetic saturation curve characteristics indicated by a substantially rectangular hysteresis loop in the direction of an applied field in the plane of said film without said magnetic core in itself forming a completely closed loop magnetic path.

References Cited in the file of this patent

UNITED STATES PATENTS

| | | |
|---|---|---|
| 2,651,833 | Kernahan | Sept. 15, 1953 |
| 2,671,950 | Sukacev | Mar. 15, 1954 |
| 2,680,156 | Thorensen | June 1, 1954 |
| 2,700,150 | Wales | Jan. 18, 1955 |
| 2,778,005 | Allen | Jan. 15, 1957 |
| 2,792,563 | Rajchman | May 14, 1957 |
| 2,811,652 | Lipkin | Oct. 29, 1957 |

FOREIGN PATENTS

| | | |
|---|---|---|
| 515,232 | Canada | Aug. 2, 1955 |

OTHER REFERENCES

Preparation of Thin Magnetic Films and Their Properties, Journal of Applied Physics, volume 26, No. 8, August 1955, pp. 975–980.

[1] Boxorth—Ferromagnetism, P-849, D. Van Nostrand Co., Inc., 1951.